US010708127B1

(12) United States Patent
Acharya et al.

(10) Patent No.: US 10,708,127 B1
(45) Date of Patent: Jul. 7, 2020

(54) LOW-LATENCY NETWORK SWITCHING DEVICE WITH LATENCY IDENTIFICATION AND DIAGNOSTICS

(71) Applicant: Arista Networks, Inc., Santa Clara, CA (US)

(72) Inventors: Dipankar Acharya, Saratoga, CA (US); Hitesh Ahuja, Westlake Village, CA (US); Darrin Machay, Chicago, IL (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/858,920

(22) Filed: Dec. 29, 2017

(51) Int. Cl.
*H04L 12/24* (2006.01)
*H04L 12/947* (2013.01)
*H04L 12/933* (2013.01)
*H04L 12/26* (2006.01)
*H04L 12/935* (2013.01)

(52) U.S. Cl.
CPC .......... *H04L 41/0806* (2013.01); *H04L 41/22* (2013.01); *H04L 43/0852* (2013.01); *H04L 49/15* (2013.01); *H04L 49/25* (2013.01); *H04L 49/30* (2013.01)

(58) Field of Classification Search
CPC . H04L 41/0806; H04L 49/30; H04L 43/0852; H04L 41/22; H04L 49/25; H04L 49/15
See application file for complete search history.

(56) References Cited

U.S. PATENT DOCUMENTS

| 2003/0174723 | A1 | 9/2003 | Dehon et al. | |
|---|---|---|---|---|
| 2007/0053356 | A1* | 3/2007 | Konda | H04L 45/00 370/390 |
| 2007/0064699 | A1* | 3/2007 | Bernick | H04L 47/56 370/392 |
| 2017/0085422 | A1 | 3/2017 | Chapman | |
| 2017/0093618 | A1 | 3/2017 | Chanda et al. | |
| 2017/0111295 | A1* | 4/2017 | Snowdon | G06F 13/00 |
| 2017/0272386 | A1 | 9/2017 | Walker et al. | |
| 2018/0013657 | A1* | 1/2018 | Cantwell | H04L 43/08 |

OTHER PUBLICATIONS

International Search Report and Written Opinion in PCT/US2018/068017 dated Apr. 9, 2019.

* cited by examiner

*Primary Examiner* — Jay Y Lee
(74) *Attorney, Agent, or Firm* — Haley Guiliano LLP

(57) ABSTRACT

A network switch device includes an L1 switch having a first set of external ports and a first set of internal ports. The network switch device further includes an L2+L3 switch having a second set of internal ports, the L2+L3 switch operatively coupled to the L1 switch via the first set of internal ports and the second set of internal ports.

24 Claims, 7 Drawing Sheets

LOW-LATENCY NETWORK SWITCHING DEVICE WITH LATENCY IDENTIFICATION AND DIAGNOSTICS

BACKGROUND

Multiple distinct network devices are traditionally used in various low-latency applications. Low-latency applications may be any application in which network latency is a priority. Combinations of separate replicators (e.g., replicator chips), multiplexors, switches, and servers may be organized in various configurations to meet the latency demands of particular applications, in which data is to be replicated (e.g., multiplexed), buffered, copied, and sent to switches and servers. Replicators typically perform one operation—replicate input data and distribute the replicated data to one or more outputs. Multiplexors may receive two or more input data, multiplex and/or buffer the data to select an appropriate output data, and distribute the output data to a single output. Switches may receive input data and route the input data to a defined destination.

Traditional low-latency systems have several drawbacks. Utilizing separate replicators, multiplexors, and switches may not be an efficient use of networking space. Furthermore, customizing data paths through various distinct components can be cumbersome and time consuming. Additionally, troubleshooting low-latency systems that include separate replicators can be difficult, because replicators are traditionally low-logic devices that push bits of information across wires, without providing any insight into the potential configuration and functionality abnormalities. Therefore, there is a need in the art for a solution which overcomes the drawbacks described above.

SUMMARY

In some embodiments, a network switching device is provided. The network switch device includes an L1 switch having a first set of external ports, a first set of internal ports, and an L2+L3 switch having a second set of internal ports. The L2+L3 switch is operatively coupled to the L1 switch via the first set of internal ports and the second set of internal ports. The device further includes a logic device having a second set of external ports. The logic device is operatively coupled to the L1 switch, and operatively coupled to the L2+L3 switch. The L1 switch, the L2+L3 switch, and the logic device are within the housing.

In some embodiments, a system is provided. The system includes a replicator chip to replicate incoming data from an input port to a one or more output ports, and a logic device, operatively coupled to the replicator chip. The logic device may multiplex and/or buffer the incoming data from a plurality of input ports to an output port. The system further includes an L2+L3 switch, operatively coupled to the replicator chip and to the logic device. The L2+L3 switch may receive a copy of the incoming packet data.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Various embodiments of a low-latency network switch device described herein include a replicator chip (e.g., an L1 switch) to replicate incoming data from an input port to a one or more output ports, a logic device to multiplex the incoming data from a plurality of input ports to an output port, and a switch chip (e.g., an L2+L3 switch) to receive a copy of the incoming data. In one embodiment, the replicator chip, the logic device, and the switch chip are within the housing. By including a replicator chip, a logic device, and a switch chip in the same system of a network switch device, efficiency, diagnostic functionality, and configurability may be increased, as described herein. In one embodiment, the systems and operations described herein provide a latency of less than approximately 4 nanoseconds (ns) for replication, 60 ns for muxing, and 200 ns for switching operations. Advantageously, the embodiments described herein allow for a single managed system, where the user does not have to interconnect the various components and manage links between them and external ports, whose inputs and outputs may be individually configured to be L2+L3 switched, L1 switched, or L1 multiplexed. For example, a user (e.g., a network administrator) may provide input (e.g., user input received via a graphical user interface, a command line interface, etc.) indicating that the network switch device should be configured with replicating and switching functionality. The network switch device may automatically enable/disable internal ports/links, may automatically couple different ports/links together, and may automatically couple ports/links to one or more of the replicator chip, the logical device, and the switch chip, etc., to configure the network device with the replicating and switching functionality (indicated by the user).

Advantageously, the embodiments described herein provide systems and operations for low-latency switching. The network device described herein may copy an analog electrical signal from one input to one or more outputs. This may result in lower latency than a traditional switch that may infer digital content and use another device to convert it back to analog output. The low-latency characteristic may enable flexible configuration of services on a low-latency external port of the network device. For example, some ports of an L1 switch may be connected to an L2-L3 switch and to a logic device within the system. Advantageously, this may allow for high-level services on a port that is capable of extreme low-latency L1-switching.

Figure 1:
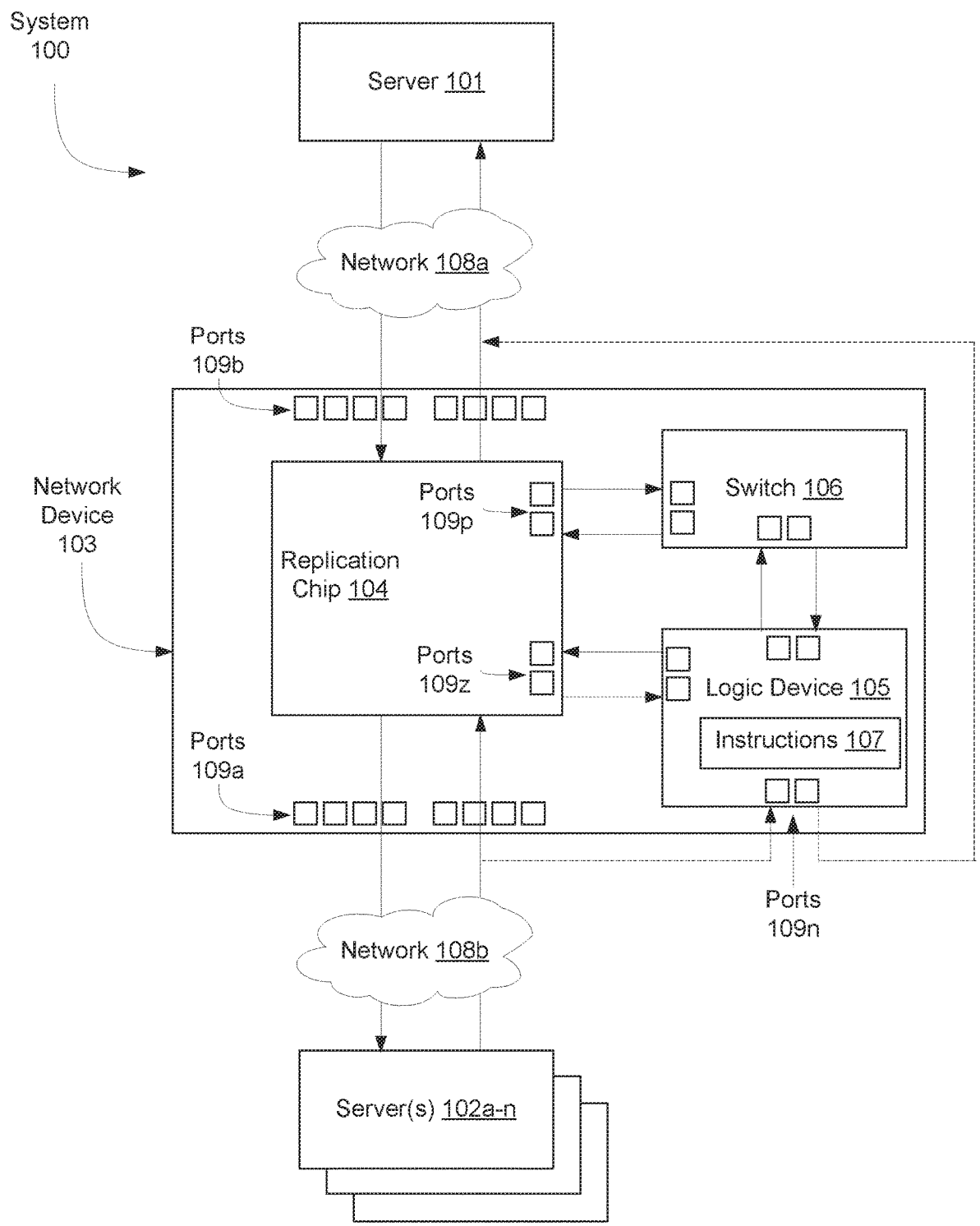
FIG. 1 is a block diagram of a system including a low-latency network device in accordance with some embodiments.

FIG. 1 is a block diagram of a system 100 including a low-latency network device 103 in accordance with some embodiments. System 100 may include one or more servers (e.g., servers 101 and 102a-n) communicating with one or more network devices (e.g., low-latency network device 103) over one or more networks (e.g., networks 108a, 108b), according to one embodiment. Networks 108a, 108b can be a local area network (LAN), a wireless network, a telephone network, a mobile communications network, a wide area network (WAN), such as the Internet, or similar communication system. Networks 108a and 108b may be the same network or different networks.

Servers 101 and 102a-n may include various data stores, and/or other data processing equipment. The servers 101 and 102a-n may be implemented by a single machine or a cluster of machines. Servers 101 and 102a-n may include, for example, computer system 700 of FIG. 7 In one embodiment, Servers 101 and 102a-n may be one server or may represent multiple servers. System 100 may optionally include one or more storage devices, which can include, for example, mass storage device such as flash memory, magnetic or optical disks, or tape drives, read-only memory (ROM); random-access memory (RAM); erasable programmable memory (e.g., EPROM and EEPROM); flash memory; or any other type of storage medium. Storage devices may be included in various components of system 100 and/or separate from the components of system 100.

System 100 may include a network switch device (e.g., network device 103), which may include a replicator chip 104 (also referred to herein as an L1 switch, a replicator, etc.), a switch 106 (also referred to herein as an L2+L3 switch, a switch chip, etc.), and a logic device 105 (also referred to herein as a programmable logic device (PLD), a field-programmable logic device (FPGA), etc.). The replicator chip 104 may be a crosspoint application-specific integrated circuit (ASIC) in one embodiment. The switch 106 may be any network switch capable of routing data from an incoming port to an outgoing port. The logic device 105 may be any programmable or non-programmable logic device, capable of storing and executing instructions (e.g., instructions 107) thereon. In one embodiment, logic device 105 may be an FPGA, a programmable logic array (PLA) device, programmable array logic (PAL) device, complex programmable logic device (CPDL), etc. Network device 103 may include, for example, computer system 700 of FIG. 7

The individual components of system 100 may be located within a single housing (e.g., a chassis, which may or may not be rack-mountable) and may be operatively coupled to each other via data communication channels, including communication links accessed via external ports (e.g., ports 109a-n; also referred to herein as "front panel ports") and internal ports (e.g., ports 9-z). It should be noted that not all external and internal ports are shown and/or labeled in FIG. 1 for the sake of clarity. More or less ports than are shown may be included in system 100 in various embodiments. For example, system 100 may include a first set of internal ports and a second set of internal ports on the switch 106 on the logic device 105. In some embodiments, the external ports (e.g., ports 109a-n, front panel ports, etc.) may be external ports. A external port may be a port whose input and output may be individually configured to be L2+L3 switched, L1 switched, or L1 multiplexed. For example, a external port that is configured to be L1 switched may be operatively coupled to an input port or an output port of a replicator chip. In another example, a external port that is configured to be L2+L2 switched may be coupled to an input port or an output port of a switch (e.g., a L2+L3 switch).

In one embodiment, Quad Small Form-factor Pluggable (e.g., 4×QSFP ports; referred to herein as a "second set of external ports") are operatively coupled to the logic device 105 to provide input and out for multiplexing, buffering, and filtering operations, while Small Form-factor Pluggable Plus (e.g., 48×SFP+; referred to herein as a "first set of external ports") and QSFP (e.g., 2×QSFP; referred to herein as a "third set of external ports") ports connect to the replicator chip 104. In one embodiment, the network device 103 includes external ports having various speeds (e.g., 10 Gigabit (Gb) and 40 Gb) and internal ports having a single speed (e.g., 10 Gb), where the logic device is configured to perform 40 Gb to 10 Gb and 10 Gb to 40 Gb translations. In various other embodiments, any other combination of port speeds may be utilized for external and internal ports. For example, ports may be configured based on the following table:

TABLE 1

| Crosspoint I/O Map: 48 × 10G + 306 × 40G | | | | |
|---|---|---|---|---|
| | L1 + T2FPGA (Mux) | | L1 + T2 (Replication) | |
| | In | Out | In | Out |
| Front-panel 10G | 48 | 48 | 48 | 48 |
| Front-panel 40G | 16* + 8** | 16* + 8** | 24* | 24* |
| Switch ASIC | 48 | 48 | 88 | 88 |
| FPGA-CP | 48 | 48 | 0 | 0 |
| CP Total | 160 | 160 | 160 | 160 |

In another embodiment, any other port configuration may be used. The ports of system 100 may include external ports, including inputs and outputs to be individually configured to be L2+L3 switched, L1-switched or L1-multiplexed.

In a "normal" switch mode (e.g., when the network device 103 is configured to perform switch operations without accessing the replicator chip 104 and logic device 105 functionality), the front panel ports may be connected in a pass-through fashion (e.g., such that data is not operated on by the replicator chip 104) to internal switch ports. Additional ports may connect the switch 106 and logic device. It should be noted that any number of ports and any type of port may be used to connect the components of system 100. Communication links between ports may be user-configurable, so as to meet the specific demands of the client. It is possible that a first direction of a link could be configured to be on the replication path and a second direction of the link could be configured to be on the mux path. Links and link directions may be separately configured so as to provide the desired outcome.

In one embodiment, a port may be an Ethernet port, which may be configured to pass through to an associated switch port, operate as a pure replication port, or go through the logic device 105. In one embodiment, incoming data may be replicated (e.g., copied) and forwarded (e.g., sent) to the switch 106 notwithstanding the ultimate destination of the data. Data may be copied and forwarded to the switch concurrently or after being operated on by the replicator chip 104 or the logic device 105, so as to not reduce the latency of the data. In one embodiment, the switch has the slowest latency of the components of network devices, and thus it may be advantageous to avoid routing data through the switch 106.

Network device 103 may provide various beneficial replication, multiplexing, buffering, switching, and diagnostic operations. In one embodiment, network device 103 may allow for use of sFlow (e.g., the standard for monitoring high-speed switched and routed networks.) sFlow functionality may be built into network equipment (e.g., switch 106) and provide visibility into network activity, enabling effective management and control of network resources and counters for L1 traffic. For example, L1 receiving ports could be coupled to switch ports, thus allowing the switch access to data replicated and multiplexed and/or buffered by the replicator chip 104 and logic device 105, respectively. Advantageously, this provides troubleshooting visibility to replicated and multiplexed/buffered data. Any other switch functionality may be utilized, even for data not directly routed to the switch, since incoming data may be mirrored to the switch regardless of the intended destination. For example, time stamping, traffic sampling, and various other diagnostic operations that result in diagnostic information may be run on the incoming and outgoing data via the switch, without affecting the latency of the data itself.

In one embodiment, transmission information may be determined based on the crosspoint configuration. Since pure crosspoint paths do not include counter information, the crosspoint chip doesn't recognize a frame from any other data. Traffic sourced from a switch port can be used to create a counter for the crosspoint ports. In one example, if switch port 1 sends 5k frames and the crosspoint is configured to replicate to ports 3-4, then it can be determined that ports 3-4 sent 5k frames since a crosspoint does not drop packets and traffic does not come from anywhere else.

In one embodiment, switch 106 may allow for traffic to be time stamped. Time stamps may be utilized in market simulations for back-testing new trading models and for network troubleshooting. Time stamped traffic may be sent to a server (e.g., server 101) to be stored and analyzed.

Switch 106 may provide additional functionality, such as low latency network address translation (NAT) and network access control list (ACL) operations on data in the replicator chip 104 and/or logic device 107 path, out-of-band L1 routing (e.g., orchestration) to make it easier to manage large L1 networks, and Precision Time Protocol (PTP) operations. In one embodiment, PTP operations may provide precise distribution over an Ethernet or IP network, as opposed to other timing solutions that utilize a discrete physical infrastructure within the data center. PTP may provide a standardized, end to end precision timing implementation that can be deployed on a standard Ethernet network, either in band our out of band of the standard data plane. In one embodiment, implementing PTP on the FPGA may allow for low latency, accurate time stamping on mux groups and/or replication groups.

In one embodiment, network device 103 (e.g., a network switch device) may be configured to provide the same probability distribution of latency from each of a plurality of external input ports to one external output port. For example, network device 103 may be configured to delay traffic on particular links from the replicator chip to enable the replicated data in each link to exit the network device at approximately the same time. In one embodiment, the traffic may be delayed in clock-cycle increments (e.g., ~3 ns).

Logic device 105 may be configured to select a port with equal probability from a first port and a second port (e.g., a plurality of ports) when data is received by the first port and the second port (e.g., the plurality of ports) at the same time. This type of "fairness" protocol may be beneficial in various applications where it is beneficial to prevent a port (e.g., a first port) from always receiving the priority in the event of a tie. This may be accomplished in a variety of ways, one non-limiting example of which may include pseudo-randomly selecting a port identifier from a list of ports stored in memory (e.g., in a random-access memory (RAM) of the logic device 105.

In one example, ports are given priority based on the following protocol: (a) Select the highest priority input port; (b) Break ties by selecting the port with oldest packet; and (c) Break ties randomly (or pseudo-randomly), as discussed above. In one embodiment, system 100 includes a descriptor first-in-first-out (FIFO) buffer for each [mux group, priority]. Each descriptor queue entry encodes which ports offered packets in one clock period. Each descriptor queue entry is a bit-vector of ports in which each bit represents an input port. Steps (a) and (b) above may be implemented by reading from the head of the highest priority non-empty descriptor queue. Step (c) above may be implemented by random arbitration over set bits of a descriptor.

In one embodiment, pseudo-random arbitration is implemented using a priority arbitration logic, where each descriptor entry uses a specific priority vector, and the priority is pseudo-randomly assigned and changed periodically. The priority may be determined in the following manner: Hardware determines the priority of a port from an ordered list (called pVec), which contains 1 unsigned integer per port. Hardware first pseudo-randomly reverses this vector and then, for input port-i, picks the i-th element from the resulting list. The random reversal has two effects: (a) In case of competition between any two inputs, it ensures identical statistical distribution (of being picked first or second); and (b) In case of competition between the same 3 or more inputs, it ensures the average order of picking is identical (in this case, the distribution may not be identical e.g., for competition between 3 inputs, one is picked second and the other two inputs are picked first or third.)

The hardware obtains the pVec by reading pvecTable [pvecPtr], where the pVecTable contains 128 software-populated pVec entries. The pVecPtr is incremented by hardware logic. Software periodically changes pVecTable entries by shuffling the vector [0, 1, . . . (PortCnt−1)]. Changing the pVec may equalize the distribution of arbitration order (between ports). The period between software updates is relatively slow (e.g., ~1 second for 10G mux-group). Hardware may provide a mechanism for software to update the pVecTable without affecting traffic flow. One way to do this is to trade off between two copies of the table, so that hardware can use one copy, while software updates another copy. There are alternate methods, any of which may be used to obtain the same or similar result. In one embodiment, pVecPtr is incremented when the count of arbitration between three or more inputs equals a threshold (conflict-Thrsh) for any (muxGroup, priority). To detect this, (mux-Group,priority) maintains a counter (conflictCnt[muxGrp, priority]), which is incremented when a decriptorEntry has three or more bits set. When any conflictCnt[muxGrpId] exceeds conflictThrs, pVecPtr is incremented and conflict-Thrsh is reloaded with a pseudo-random number in the range two to six.

The hardware function described above is described by the following pseudocode:

```
for each new decriptorEntry read from a descriptor-queue {
    if (descriptorEntry has more than 2 set bits) {
        conflictCnt[muxGrpId,priority] += 1;
        if (conflictCnt[muxGrpId,priority] >= conflictThrsh) {
            // load new threshold
            conflictThrsh = rand3;
            // clear all conflictCnt
            for all (muxGrpId, priority)
                conflictCnt[muxGrpId,priority] = 0
            // increment pVecPtr
            after reading pVecTbl[pVecPtr] for this descriptorEntry
                pVecPtr = (pVecPtr + 1)% pVecTblSize;
        }
    }
}
```

Figure 2:
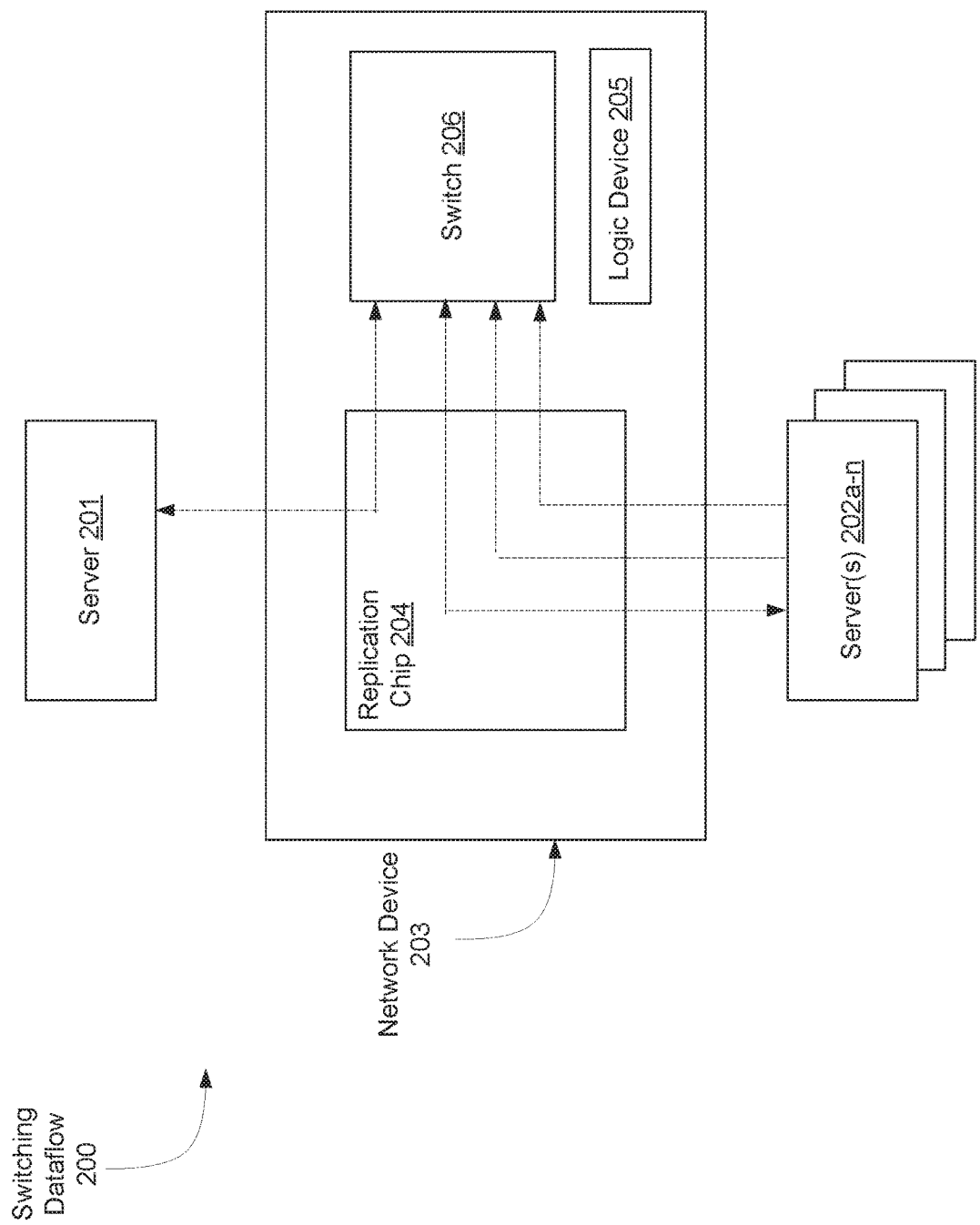
FIG. 2 is a block diagram of a switching dataflow in a low-latency network device in accordance with some embodiments.

FIG. 2 is a block diagram of a switching dataflow in a low-latency network device 203 in accordance with some embodiments. In one embodiment, in a purely switching configuration, ports and links of the network device 203 may be configured to route data to and from the switch 206 and the servers 201 and 202a-n via pass-through ports of the replicator chip 204. In this configuration, data is not operated on by the replicator chip, and may not be routed through a logic device 205.

Figure 3:
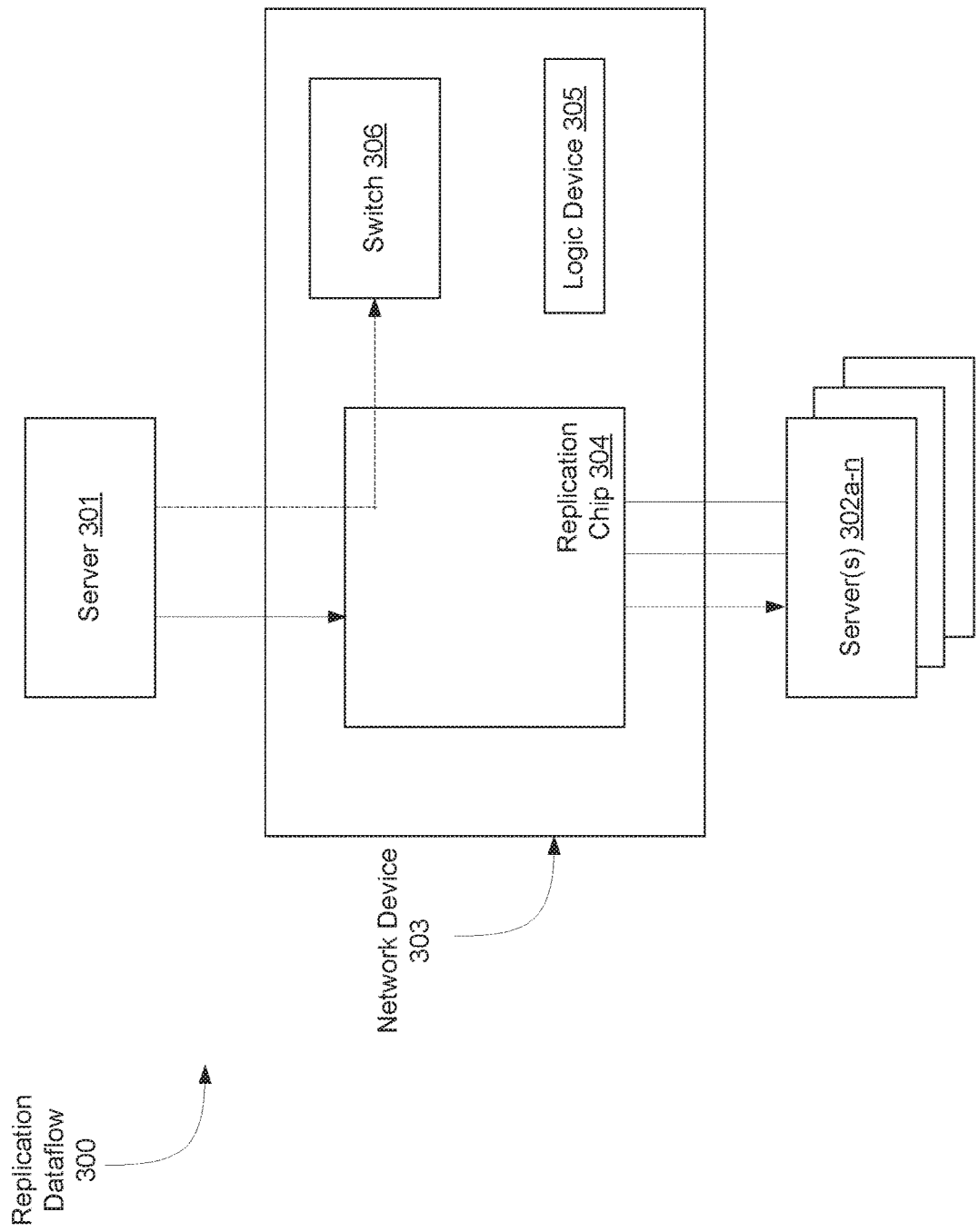
FIG. 3 is a block diagram of a replication dataflow in a low-latency network device in accordance with some embodiments.

FIG. 3 is a block diagram of a replication dataflow in a low-latency network device 303 in accordance with some embodiments. In one embodiment, in a replication configuration, ports and links of the network device 303 may be configured to receive input data on an external port of network device 303 (e.g., from server 301), replicate the data, and provide the data to one or more servers (e.g., servers 302a-n). Ports and links of the network device 203 may be configured to mirror (e.g., replicate, copy) the incoming data to ports of the switch 306. As discussed above, this may allow for the utilization of diagnostic operations that may not otherwise be available to replicated data. In this configuration, data may not be routed through a logic device 305.

Figure 4:
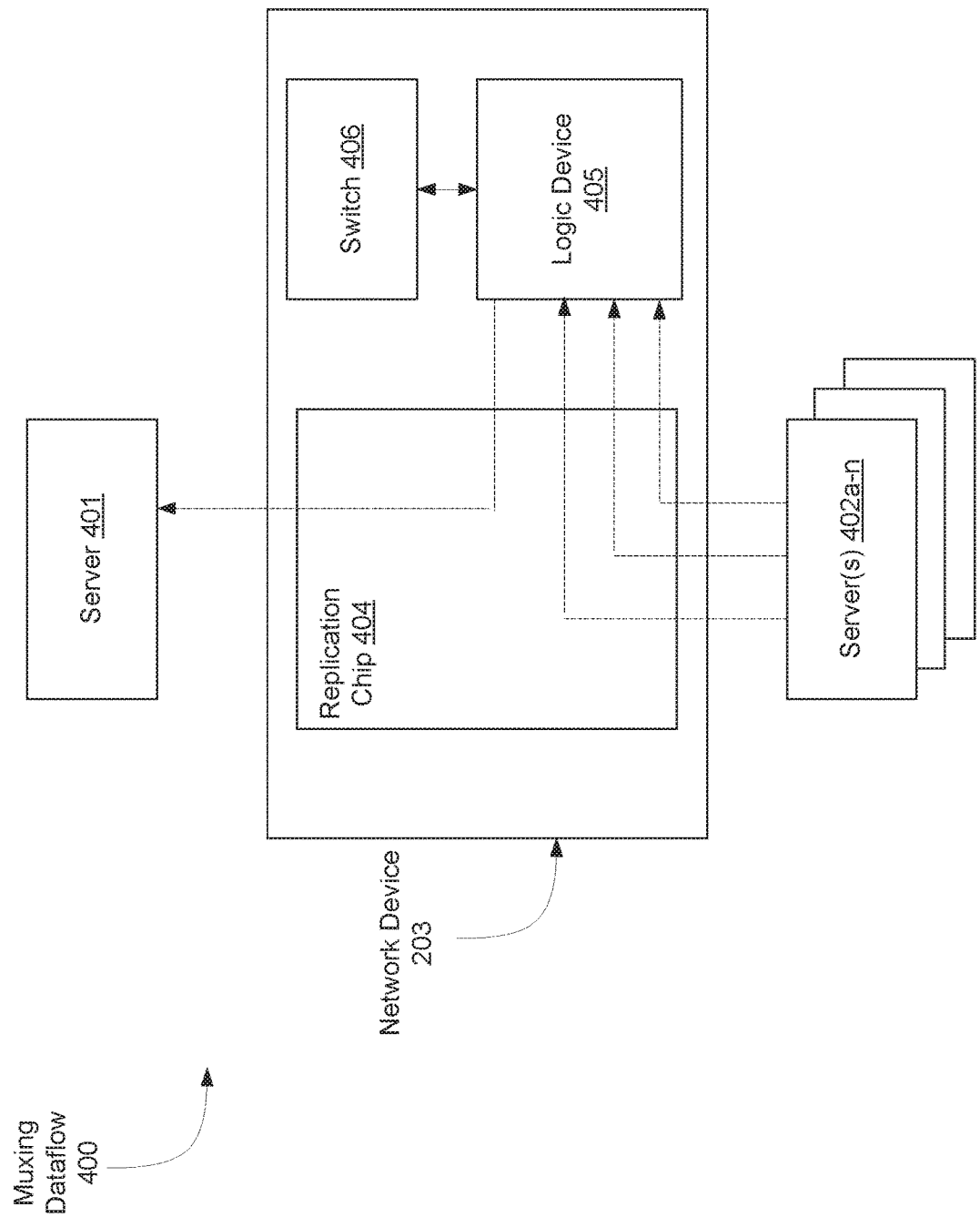
FIG. 4 is a block diagram of a muxing dataflow in a low-latency network device in accordance with some embodiments.

FIG. 4 is a block diagram of a muxing dataflow in a low-latency network device in accordance with some embodiments. In one embodiment, in a muxing configuration, ports and links of the network device 403 may be configured to receive input data on two or more external ports of network device 403 (e.g., from one or more servers 402a-n), multiplex and/or buffer (e.g., filter) the data, and provide the result to one or more servers (e.g., server 401). Ports and links of the network device 403 may be configured to mirror (e.g., replicate, copy) the incoming data to ports of the switch 306 if data was received via a port to the replicator chip, or to copy and forward the copied data to switch 406 directly if the data was received via an external port directly associated with the logic device 405. As discussed above, this may allow for the utilization of diagnostic operations that may not otherwise be available to buffered/multiplexed data. In this configuration, data may optionally not be routed through the replicator chip 404. It should be noted that logic device 405 may also receive data from the switch 406 to be buffered/multiplexed (e.g., in a switch peering connection).

It is worth mentioning that the low-latency network device as described herein may be repeatedly programmed (e.g., customized, configured, etc.) by nature of the inclusion of the PLD to perform any operation deemed suitable for the desired application. Furthermore, any combination of the configurations described herein may be performed in combination.

Figure 5:
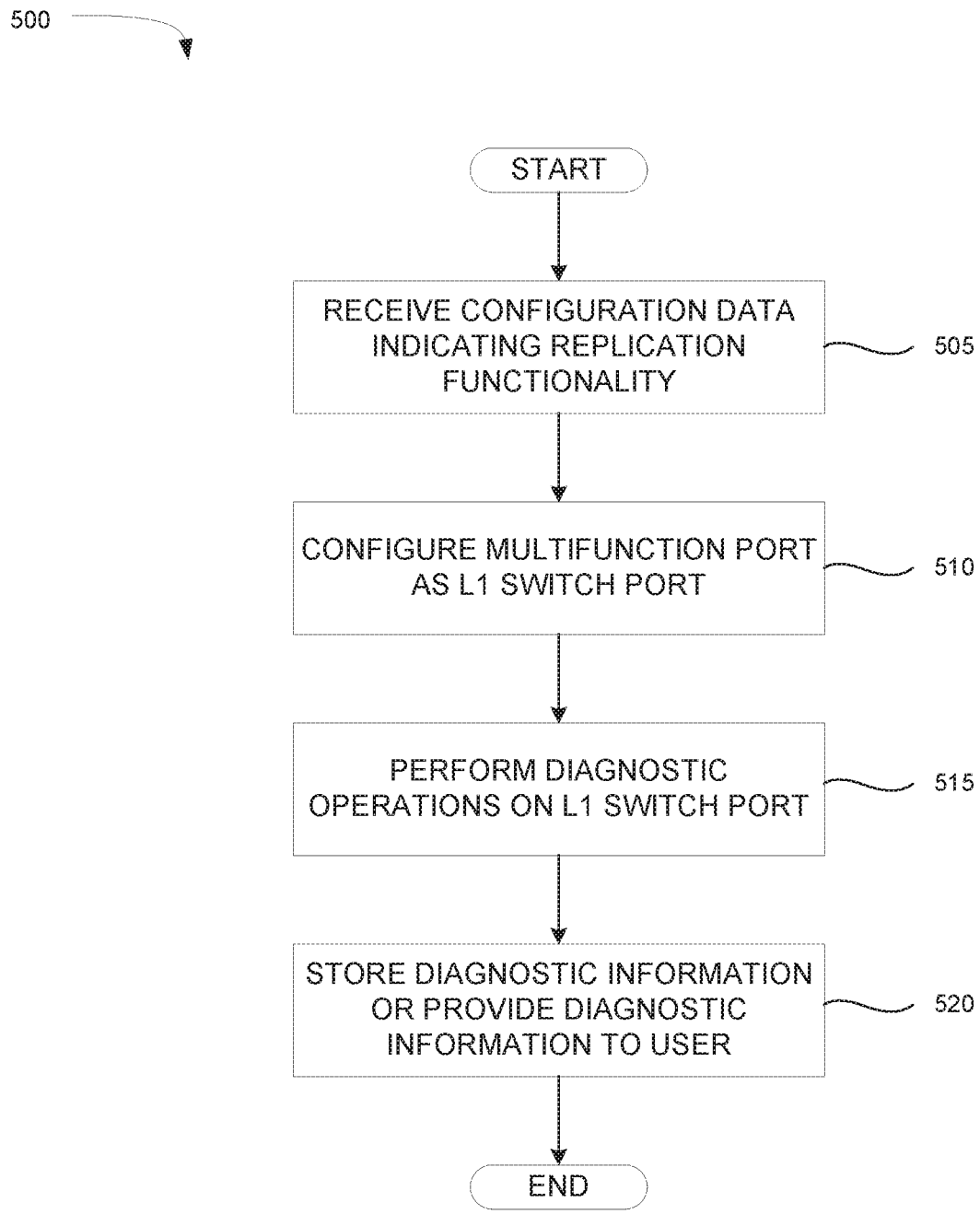
FIG. 5 is a flow diagram of a method of configuring a low-latency network device in accordance with some embodiments.

FIG. 5 is a flow diagram of a method 500 of configuring a low-latency network device in accordance with some embodiments. The method 500 may be practiced by embodiments of the network device and/or computing device as described herein. Method 500 may be performed by processing logic that may comprise hardware (e.g., circuitry, dedicated logic, programmable logic, a processor, a processing device, etc.), software (such as instructions running on a processing device), firmware, or a combination thereof.

In action 505, configuration data indicating replication functionality may be received. For example, a network device (or a computing device) may receive user input (from a user) via a graphical user interface or a command line interface. The user input may indicate that the network device should be configured to provide replication functionality (e.g., replicate input data and distribute the replicated data to one or more outputs). In another example, the network device may receive configuration data via a configuration file/setting. The network device may access (e.g., read) the configuration file to determine that the network device should be configured to provide replication functionality.

In action 510, one or more external ports (e.g., ports which may be selectively coupled to one or more of a replicator chip, a switch, or a logic device) of the network device may be configured as an L1-switched port (e.g., a port that is coupled to a replicator chip or L1-switch). For example, a first external port may be coupled to an input port of a replicator chip (e.g., an L1 switch) and a second external port may be coupled to an output port of the replicator chip. Data (e.g., packets) received by the first external port may be provided to the replicator chip (which replicates the data) via the input port (of the replicator chip) and the replicator chip may provide the data to the second external port via the output port (of the replicator chip).

In action 515, diagnostic operations may be performed on the L1 switch port. For example, the replicator chip may monitor, count, and/or analyze packets that are transmitted/received via the L1 switch port. In another example, the replicator chip may perform time stamping, traffic sampling, and various other diagnostic operations on packets that are transmitted/received via the L1 switch port. This may allow the replicator chip to obtain diagnostic information on the incoming and/or outgoing packets without affecting the latency of the packets. In one embodiment, a copy of packet data may be received from the logic device. Processing logic may collect statistics and diagnostic information associated with the packet data, and provide at least one of: the statistics or diagnostic information in response to receiving a request for the statistics or diagnostic information.

In action 520, the diagnostic information (e.g., time stamps, packet counts, data rates, etc.) may be stored or may be provided/presented to a user. For example, the packet count for packets received via the L1 switched port a period of time may be stored in a memory of the network device for later access/retrieval. In another example, the average data rate through the L1 switched port may be provided to a user via an interface (e.g., a graphical user interface, a command line interface, etc.).

Figure 6:
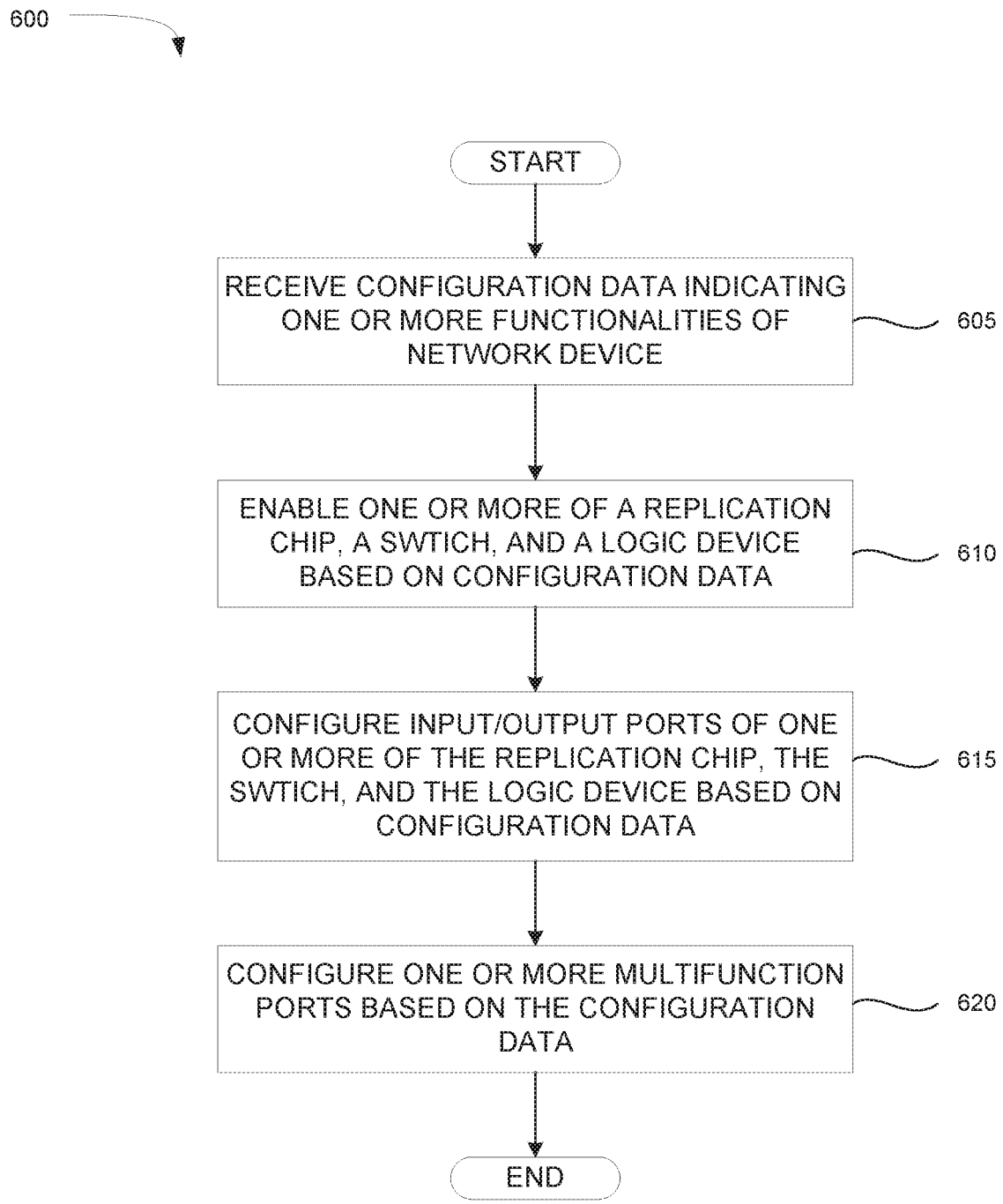
FIG. 6 is a flow diagram of a method of configuring a low-latency network device in accordance with some embodiments.

FIG. 6 is a flow diagram of a method 600 of configuring a low-latency network device in accordance with some embodiments. The method 600 may be practiced by embodiments of the network device and/or computing device as described herein. Method 600 may be performed by processing logic that may comprise hardware (e.g., circuitry, dedicated logic, programmable logic, a processor, a processing device, etc.), software (such as instructions running on a processing device), firmware, or a combination thereof.

In action 605, configuration data indicating one or more functionalities of the network device may be received. For example, a network device (or a computing device) may receive user input (from a user) via a graphical user interface or a command line interface. The user input may indicate that the network device should be configured to provide one or more functionalities (e.g., replication functionality, muxing functionality, switching functionality). In another example, the network device may receive configuration data via a configuration file/setting. For example, the network device may access (e.g., read) the configuration file to determine the functionalities that should be provided by the network device.

As discussed above, the network device may include a replicator chip (e.g., a L1-switch), a logic device (e.g., a programmable logic device, a multiplexor, etc.), and/or a switch chip (e.g., an L2+L3 switch). The replicator chip may provide replication functionalities by replicating data received via an input port of the replicator chip and transmitting/forwarding the received data to an output port of the replicator chip, as discussed above. The logic device may provide muxing (e.g., multiplexing) functionalities by receiving data from one or more input ports of the logic device and transmitting/forwarding the data to one output port (of multiple output ports) of the logic device, as discussed above. The switch may provide switching functionality by routing data from an input port of the network device to an output port of the network device, as discussed above. For example, the switch may be able to route data received from any input port (of the network device) to any output port (of the network device).

In action 610, processing logic may configure, by a processing device, one or more external ports of one or more of an L1 switch, an L2+L3 switch, or a logic device to enable one or more of L1-replication or 1-1 multiplexor operations, based on the configuration data. For example, if the configuration data indicates that switching functionality and replication functionality are desired by the user, the replicator chip and the switch may be enabled. In another example, if the configuration data indicates that replication functionality is desired by the user, the replicator chip may be enabled. In one embodiment, enabling (one or more of the replicator chip, the switch, and the logic device) may refer to powering up (e.g., booting, starting, etc.) the replicator chip, the switch, or the logic device, or may refer to transitioning one or more of the replicator chip, the switch, and the logic device out of a low power state (e.g., a sleep state, a hibernation state, etc.).

In action 615, processing logic may configure, by the processing device, one or more internal links and resources based on the configuration data. For in one example, if the user data indicates that switching functionality and replication functionality are desired by the user, one or more output ports of the replicator chip may be operatively coupled to the one or more input ports of the switch chip. In another example, if the user data indicates that replication functionality and muxing functionality are desired by the user, one or more output ports of the replicator chip may be operatively coupled to the one or more input ports of the logic device. In one embodiment, the configuration of the input/output ports may be performed automatically based on the configuration data. For example, the input/output ports of one or more of the replicator chip, the switch, and the logic device may be coupled to each other (e.g., interconnected) without additional user input.

Processing logic may configure one or more external ports of the network device based on the configuration data. As discussed above, external ports may include inputs and outputs that may be individually configured to be L2+L3 switched, L1 switched, or L1 multiplexed. The external ports may be configured to be L2+L3 switched, L1 switched, or L1 multiplexed based on the configuration data. For example, if the user data indicates that replication functionality is desired by the user, a first external port may be configured to be L1 switched (e.g., may be coupled to an input port of the replicator chip) and a second external port may be configured to be L1 switched (e.g., may be coupled to an output port of the replicator chip). This may allow data received by the first external port to be replicated and transmitted/forward via the second external port. In one embodiment, the configuration of the one or more external ports may be performed automatically based on the configuration data. For example, the external ports may be coupled to one or more of the replicator chip, the switch, and the logic device without additional user input.

In one embodiment, processing logic may configure the network device to perform a variety of low-latency operations. Processing logic may configure low-latency pass-through and L1-replication between a plurality of external ports of the network device. Processing logic may configure port-mirroring or packet statistics collection associated with a plurality of low-latency L1-replication ports of the network device. Processing logic may configure low-latency L1-multipultiplexing on the network device. Processing logic may configure latency-fair arbitration (e.g., latency normalization) for multiplexing on the network device.

Figure 7:
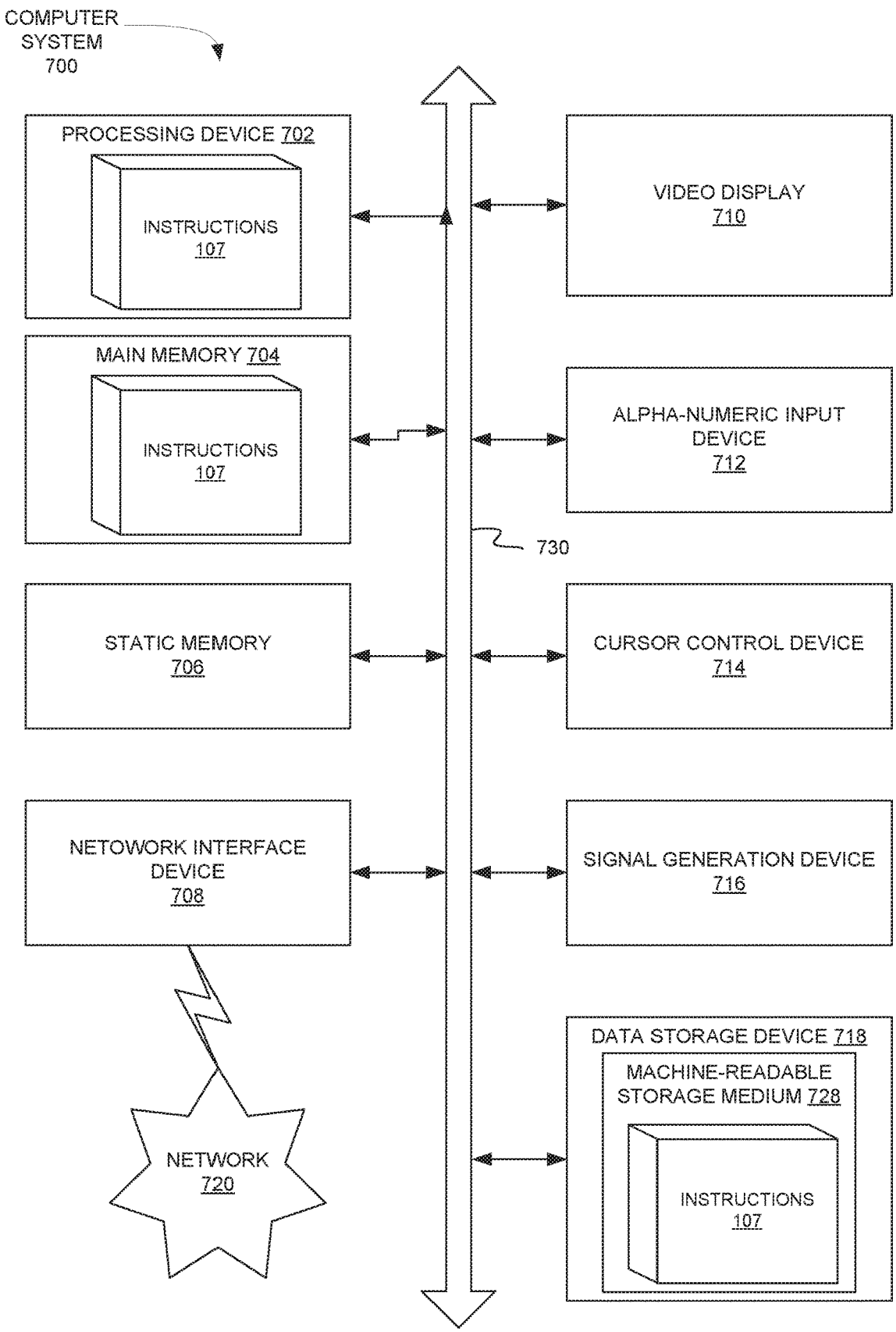
FIG. 7 is a block diagram of an example computing device that may perform one or more of the operations described herein in accordance with some embodiments.

FIG. 7 is a block diagram of an example computing device 700 that may perform one or more of the operations described herein in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the low-latency network device operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions for carrying out the low-latency network device operations described herein, in accordance with one or more aspects of the present disclosure. Instructions implementing module 726 may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 708.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending," "forwarding," "replicating," "buffering," "filtering," "multiplexing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A network switch device, comprising:
   an L1 switch having a first set of external ports, and a first set of internal ports; and
   an L2+L3 switch having a second set of internal ports, the L2+L3 switch operatively coupled to the L1 switch via the first set of internal ports and the second set of internal ports, wherein the L2+L3 switch and the L1 switch are selectively coupled based on configuration data received from a user, and wherein:
   in a first configuration according to the configuration data, data received by an external port of the first set of external ports is passed through to an internal port of the second set and is forwarded by the L2+L3 switch without replication by the L1 switch; and
   in a second configuration according to the configuration data, data received by an external port of the first set of external ports is replicated to a plurality of external ports of the L1 switch without being forwarded by the L2+L3 switch.

2. The network switch device of claim 1, further comprising: a logic device operatively coupled to the L1 switch and to the L2+L3 switch.

3. The network switch device of claim 2, wherein the logic device is to select, with equal probability, a port from a plurality of ports of the logic device when data is received by the plurality of ports at the same time.

4. The network switch device of claim 2, wherein a plurality of links of the network switch device are configurable to route data through at least one of the L1 switch, the L2+L3 switch, or the logic device.

5. The network switch device of claim 2, wherein the logic device is to:
   receive packet data via a first port of the logic device; and
   transmit the packet data to a second port of the logic device, wherein the receive step and the transmit step are performed without accessing the L2+L3 switch.

6. The network switch device of claim 5, wherein the L2+L3 switch is to:
   receive the copy of the packet data from the logic device; and
   collect statistics and diagnostic information associated with the packet data; and
   provide at least one of: the statistics or diagnostic information in response to receiving a request for the statistics or diagnostic information.

7. The network switch device of claim 5, wherein the L2+L3 switch is to:
   receive the copy of the packet data from the logic device; and
   send the copy of the packet data to a network analysis tool.

8. The network switch device of claim 1, wherein the network switch device is to provide a same probability distribution of latency from each of a plurality of external input ports to one external output port of the network switch device.

9. The network switch device of claim 1, wherein the L1 switch is to send a copy of the replicated data to the L2+L3 switch via the first and the second set of internal ports.

10. A system, comprising:
    a replicator chip to replicate incoming data from an input port to one or more output ports;
    a switch chip, operatively coupled to the replicator chip, the switch chip to receive a copy of the incoming data, wherein the switch chip and the replicator chip are selectively coupled based on configuration data received from a user, and wherein:
    in a first configuration according to the configuration data, data received by the switch chip is forwarded by the switch chip without replication by the replicator chip; and
    in a second configuration according to the configuration data, incoming data received by the replicator chip is replicated to the one or more output ports without being forwarded by the switch chip.

11. The system of claim 10, further comprising: a logic device, operatively coupled to the replicator chip, the logic device to multiplex the incoming data from a plurality of input ports to an output port.

12. The system of claim 11, wherein the logic device is to select, with equal probability, a port from a plurality of ports of the logic device when data is received by the plurality of ports at the same time.

13. The system of claim 11, wherein a plurality of external ports of the network device are configurable to route data through at least one of the replicator chip, the logic device, or the switch chip.

14. The system of claim 10, wherein the replicator chip is to:
    replicate data received by the networking device via a first external input port;
    distribute the replicated data to one or more external output ports, wherein the replicate step and the distribute step are performed without accessing the switch chip; and
    send a copy of the replicated data via an internal port to the switch chip.

15. The system of claim 14, wherein the logic device is further to send a copy of the replicated data to the switch chip.

16. The system of claim 10, wherein the network device is to provide a same probability distribution of latency from each of a plurality of external input ports to one external output port of the network switch device.

17. The system of claim 10, wherein the system is to: mirror, count, and collect statistics on packets and bytes on replicator chip ports.

18. The system of claim 10, further comprising external ports, including inputs and outputs to be individually configured to be L2+L3 switched, L1-replicated or L1-multiplexed.

19. A method, comprising:
receiving configuration data indicating one or more functionalities of a network device;
configuring, by a processing device, a plurality of external ports of one or more of an L1 switch, an L2+L3 switch, or a logic device to enable one or more of L1-replication or L1 multiplexor operations, based on the configuration data; and
configuring, by the processing device, one or more internal links and resources based on the configuration data, wherein:
in a first configuration according to the configuration data, data received by an external port of the plurality of external ports is passed through to the L2+L3 switch and is forwarded by the L2+L3 switch without replication by the L1 switch; and
in a second configuration according to the configuration data, data received by an external port of the plurality of external ports is replicated to the plurality of external ports without being forwarded by the L2+L3 switch.

20. The method of claim 19, further comprising: configuring one or more of: low-latency pass-through or L1-replication between a plurality of external ports of the network device.

21. The method of claim 19, further comprising: configuring one or more of: port-mirroring or packet statistics collection associated with a plurality of low-latency L1-replication ports of the network device.

22. The method of claim 19 further comprising: configuring low-latency L1-multipultiplexing on the network device.

23. The method of claim 19, further comprising: configuring latency-fair arbitration for multiplexing on the network device.

24. The method of claim 19, wherein the configuration data is received via a graphical user interface or a command line interface.

* * * * *